UNITED STATES PATENT OFFICE.

CHARLES GOODYEAR, JR., OF NEW YORK, N. Y., EXECUTOR OF ESTATE OF CHARLES GOODYEAR, DECEASED.

IMPROVEMENT IN MAKING HOLLOW ARTICLES OF INDIA-RUBBER.

Specification forming part of Letters Patent No. 5,536, dated April 25, 1848; extended seven years; Reissue No. 2,169, dated February 13, 1866.

*To all whom it may concern:*

Be it known that CHARLES GOODYEAR, of New Haven, in the county of New Haven and State of Connecticut, deceased, did invent a new and useful article of manufacture or trade, being based upon a new process or mode of manufacturing caoutchouc or india-rubber or its equivalent, consisting of hollow balls or toys or other articles of like character; and I do hereby declare that the nature of the same is fully described and represented in the following specification.

The article termed in commerce "vulcanized india-rubber" consists, usually, of a composition of gum-elastic and sulphur subjected to a high degree of heat, or one sufficient to "cure" it or divest it of adhesive properties, and impart to it powers of resistance to the action of various chemical or other matters not enjoyed by caoutchouc in its primitive or manufactured state. In the making of hollow spheres, and various other hollow articles of such vulcanized rubber, the rubber is employed in sheets and in the state in which it is just previous to being baked or exposed to heat, as aforesaid, the rubber being then in a tacking or adhesive state. It is cut into such shape or shapes as will allow of its being laid in a mold of the article to be produced, and so as to cover the whole internal surface of said mold, and so that the adjacent edges of the piece or several pieces so laid in the mold may be laid close together, or so as to touch or nearly touch one another.

To form a hollow ball the pieces may be cut or shaped like the four quarters of an orange-peel. The molds may be made of iron or other proper material capable of withstanding the heat, and internal pressure arising from expansion of air produced by the heat during the baking or curing process. Its joints should be made to fit well and close, so as to prevent, as far as possible, what are termed "mold marks," being made on the article formed in it. When the pieces of india-rubber or gum-elastic composition are laid in the mold, care must be taken that atmospheric air be suffered to remain along with the same in the interior of the mold. The mold may be made, if necessary, so as to admit of air being forced into it and between the pieces of rubber in it after it is closed together, and before or during the process of heating it. After the mold and rubber are so prepared, the whole should be subjected to the degree of heat sufficient to expand the air within the same, and to cause it to force the rubber closely against the interior surface of the mold in such manner as not only to make it take the shape of the mold, but to make its edges in contact unite with each other. The degree of heat required to perform such should be equal to or less than that required for the curing process abovementioned, it being intended that it shall always be equal to that required to fully and completely cure the article or render it non-adhesive, and possessing the usual properties of the vulcanized india-rubber. When removed from the mold, the article will be found to have taken the shape required, and to contain the quantity of air necessary to insure its constant inflation.

What is claimed as the invention of the said CHARLES GOODYEAR, deceased, and as a new article of manufacture and trade, is as follows:

Hollow vulcanized india-rubber articles the external shape of which is produced by internal pressure derived from an elastic fluid.

In testimony whereof I have signed my name to this specification before two subscribing witnesses.

CHAS. GOODYEAR, JR.

Witnesses:

A. POLLOK,

CHARLES NETTLETON.